(12) United States Patent
Wu et al.

(10) Patent No.: US 8,080,589 B2
(45) Date of Patent: Dec. 20, 2011

(54) METHOD FOR PRODUCING A BIO-BASED POLYMERIC SHOE COMPONENT

(75) Inventors: Shu-Yii Wu, Taichung (TW); Shih-Chien Chu, Taichung (TW); Ting-Yu Lee, Taichung (TW); Ming-Lei Wang, Taichung (TW); Yan-Ting Shen, Douliu (TW); Ying-Ming Lu, Changhua (TW); Yu-Hsin Chu, Tainan County (TW)

(73) Assignees: Pou Chien Technology Co., Ltd., Taichung (TW); Feng Chia University, Taichung (TW)

( * ) Notice: Subject to any disclaimer, the term of this patent is extended or adjusted under 35 U.S.C. 154(b) by 0 days.

(21) Appl. No.: 12/791,994

(22) Filed: Jun. 2, 2010

(65) Prior Publication Data

US 2010/0237527 A1 Sep. 23, 2010

Related U.S. Application Data

(63) Continuation-in-part of application No. 12/350,537, filed on Jan. 8, 2009.

(30) Foreign Application Priority Data

May 16, 2008 (TW) ................................ 97118121 A
Jul. 1, 2009 (TW) ................................ 98122226 A

(51) Int. Cl.
*C08J 9/00* (2006.01)
*A43B 13/14* (2006.01)
*B27M 3/20* (2006.01)
*C08L 3/06* (2006.01)

(52) U.S. Cl. ......... 521/50; 36/25 R; 264/45.1; 428/35.6; 521/82; 521/84.1; 523/128; 524/47

(58) Field of Classification Search .................... 521/50, 521/82, 84.1; 36/25 R; 428/35.6; 523/128; 524/47; 264/45.1
See application file for complete search history.

(56) References Cited

U.S. PATENT DOCUMENTS

2002/0136848 A1* 9/2002 Yoshii et al. ................. 428/35.7
* cited by examiner

*Primary Examiner* — Timothy J. Kugel
(74) *Attorney, Agent, or Firm* — Frommer Lawrence & Haug LLP; Ronald R. Santucci

(57) ABSTRACT

A method for producing a bio-based polymeric shoe component includes: preparing a blend from a composition including 5~50 weight parts of a modified starch, 50~95 weight parts of an ethylene vinyl acetate copolymer, 5~30 weight parts of a filler, 1~50 weight parts of a polyolefin, 2.0~8.0 weight parts of a foaming agent, 0.5~3.0 weight parts of a foaming aid, 0.5~2.0 weight parts of a lubricant, and 0.4~1.2 weight parts of a crosslinking agent, the modified starch being obtained by hydrolyzing and esterifying a predetermined amount of a raw starch to form a hydrolyzed and esterified starch, followed by drying the hydrolyzed and esterified starch; processing the blend into a foamable product; and forming the foamable product into the shoe component.

19 Claims, 2 Drawing Sheets

METHOD FOR PRODUCING A BIO-BASED POLYMERIC SHOE COMPONENT

CROSS-REFERENCE TO RELATED APPLICATION

This application claims priority of Taiwanese application no. 098122226, filed on Jul. 1, 2009, and is a continuation-in-part (CIP) of co-pending U.S. patent application Ser. No. 12/350,537, filed on Jan. 8, 2009 and claims priority of Taiwanese application number 097118121 filed May 16, 2008. The disclosure of U.S. patent application Ser. No. 12/350,537 is incorporated herein by reference.

BACKGROUND OF THE INVENTION

1. Field of the Invention

The invention relates to a method for producing a shoe component, more particularly to a method for producing a bio-based polymeric shoe component.

2. Description of the Related Art

Ethylene vinyl acetate (abbreviated as EVA) copolymer is a main raw material commonly used in a shoe component of sole pad, midsole or outsole, and is derived from the by products of the petroleum industry. Like other plastic materials, EVA copolymer materials face the problems of increasing cost of petrochemical oil price, non-degradability and environmental pollution at the end of its life cycle.

In order to mitigate the above problems, biomaterials, such as starch, are used to mix with EVA copolymer to produce a bio-based polymeric shoe component. Nevertheless, the biomaterials and EVA copolymer do not have good bonding strength therebetween. Therefore, for better structural strength of the shoe components, the proportion of the biomaterials in admixture with EVA copolymer is low. Furthermore, it is possible to increase the bonding strength between the biomaterials and EVA copolymer by processing those materials under a special condition in higher temperature and pressure or by using modified biomaterials (modified starch) instead.

Because the process conducted at higher temperature and pressure will increase the manufacturing cost, the use of the modified biomaterials is currently more preferable for producing the shoe components.

In order to obtain a bio-based polymeric shoe component with better physical properties, such as structural strength, the parameters controlled in the method for producing the shoe components are also important.

SUMMARY OF THE INVENTION

Therefore, the main object of the present invention is to provide a method for producing a bio-based polymeric shoe component that has a lower manufacturing cost, and that has good physical properties.

Accordingly, there is provided a method for producing a bio-based polymeric shoe component comprising:

preparing a blend from a composition comprising 5~50 weight parts of a modified starch, 50~95 weight parts of an ethylene vinyl acetate copolymer, 5~30 weight parts of a filler, 1~50 weight parts of a polyolefin, 2.0~8.0 weight parts of a foaming agent, 0.5~3.0 weight parts of a foaming aid, 0.5~2.0 weight parts of a lubricant, and 0.4~1.2 weight parts of a crosslinking agent, the modified starch being obtained by hydrolyzing and esterifying a predetermined amount of a raw starch to form a hydrolyzed and esterified starch, followed by drying the hydrolyzed and esterified starch;

processing the blend into a foamable product; and
forming the foamable product into the shoe component.

The modified starch has an increased contact surface area that enhances bondability with ethylene vinyl acetate (EVA) copolymer when the modified starch and EVA copolymer are mixed, thereby improving compatibility between the modified starch and EVA copolymer. Therefore, the proportion of the biomaterial (i.e., the modified starch) can be increased without weakening the physical properties, and the manufacturing cost can be lowered.

Furthermore, by controlling the proportion of the components in the composition for producing the bio-based polymeric shoe component, the bio-based polymeric shoe component can be provided with predetermined requirements complying with the physical property standards for shoe components.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
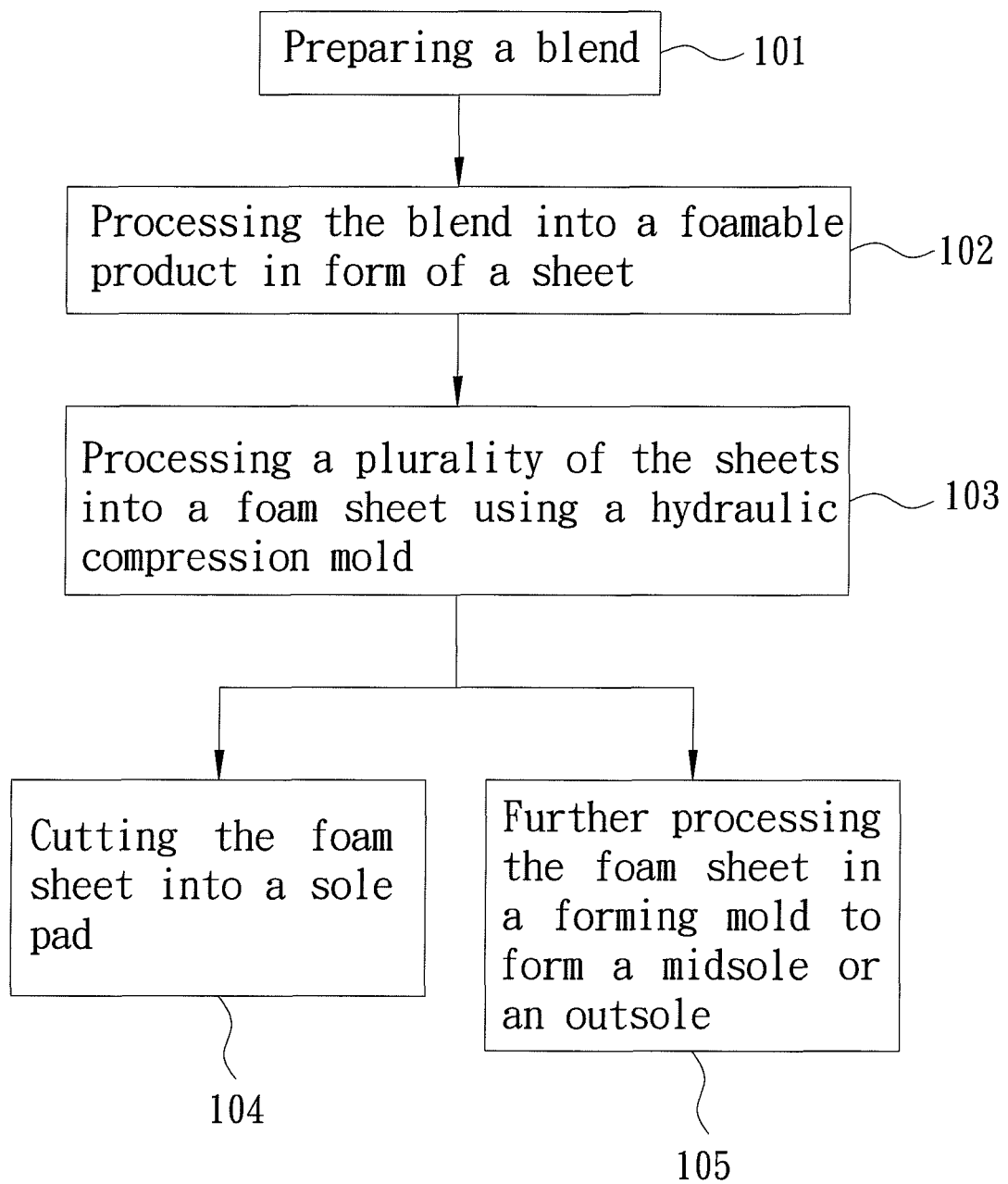
FIG. 1 is a flow chart showing the first preferred embodiment of the method for producing a bio-based polymeric shoe component according to the present invention.

Referring to FIG. 1, the preferred embodiment of the method for producing a bio-based polymeric shoe component according to the invention includes the following steps:

In step 101, a blend is prepared by mixing and heating a composition for 6~15 minutes at a temperature of 100° C. ~130° C. using a mixer. The mixer is one of a kneader mixer and a twin-screw extruder. The composition comprises 5~50 weight parts of a modified starch, 50~95 weight parts of an ethylene vinyl acetate (EVA) copolymer, 5~30 weight parts of a filler, 1~50 weight parts of a polyolefin, 2.0~8.0 weight parts of a foaming agent, 0.5~3.0 weight parts of a foaming aid, 0.5~2.0 weight parts of a lubricant, and 0.4~1.2 weight parts of a crosslinking agent. A total weight of the modified starch and the ethylene vinyl acetate copolymer in the blend is 100 parts by weight.

The modified starch is obtained by hydrolyzing and esterifying a predetermined amount of a raw starch to form a hydrolyzed and esterified starch, followed by drying the hydrolyzed and esterified starch. The raw starch that has a number average molecular weight not less than $10^8$ is hydrolyzed using an inorganic solution that has a concentration of 0.5N~2N to form a hydrolyzed starch having a number average molecular weight ranging from $10^4$ to $10^7$. The hydrolyzed starch is esterified using an organic acid or an acid anhydride to form a hydrolyzed and esterified starch. The hydrolyzed and esterified starch is dried by spray drying to obtain the modified starch. In this embodiment, the hydrolyzed starch is esterified using an acetic anhydride, in which the carboxyl groups react with the hydroxyl groups on the surface of the hydrolyzed starch during esterification.

Preferably, the modified starch has a size ranging from 10 μm to 50 μm and a moisture content ranging from 2% to 8%.

Preferably, the filler is selected from a group consisting of calcium carbonate, talcum powder, magnesium carbonate, kaolin, and combinations thereof. The crosslinking agent is dicumyl peroxide (DCP). The lubricant is stearic acid. The foaming aid is zinc oxide.

In step 102, the blend is processed by a twin-roller into a foamable product. The foamable product is a sheet.

In step 103, a foam sheet is formed using a hydraulic compression mold. In this embodiment, the foam sheet is formed by stacking a plurality of the sheets having a predetermined weight, and placing the sheets in the pre-heated hydraulic compression mold that is operated under a temperature of 165° C.~175° C. and a pressure of 160 kg/cm²~200 kg/cm². Preferably, the sheets are placed and processed in the hydraulic compression mold for 20~50 minutes.

The foam sheet produced in step 103 can be processed further through the following step 104 or 105.

In step 104, the foam sheet formed in step 103 is cut into a sole pad.

In step 105, the foam sheet formed in step 103 is further processed by forming in a forming mold to form a midsole or an outsole.

Figure 2:
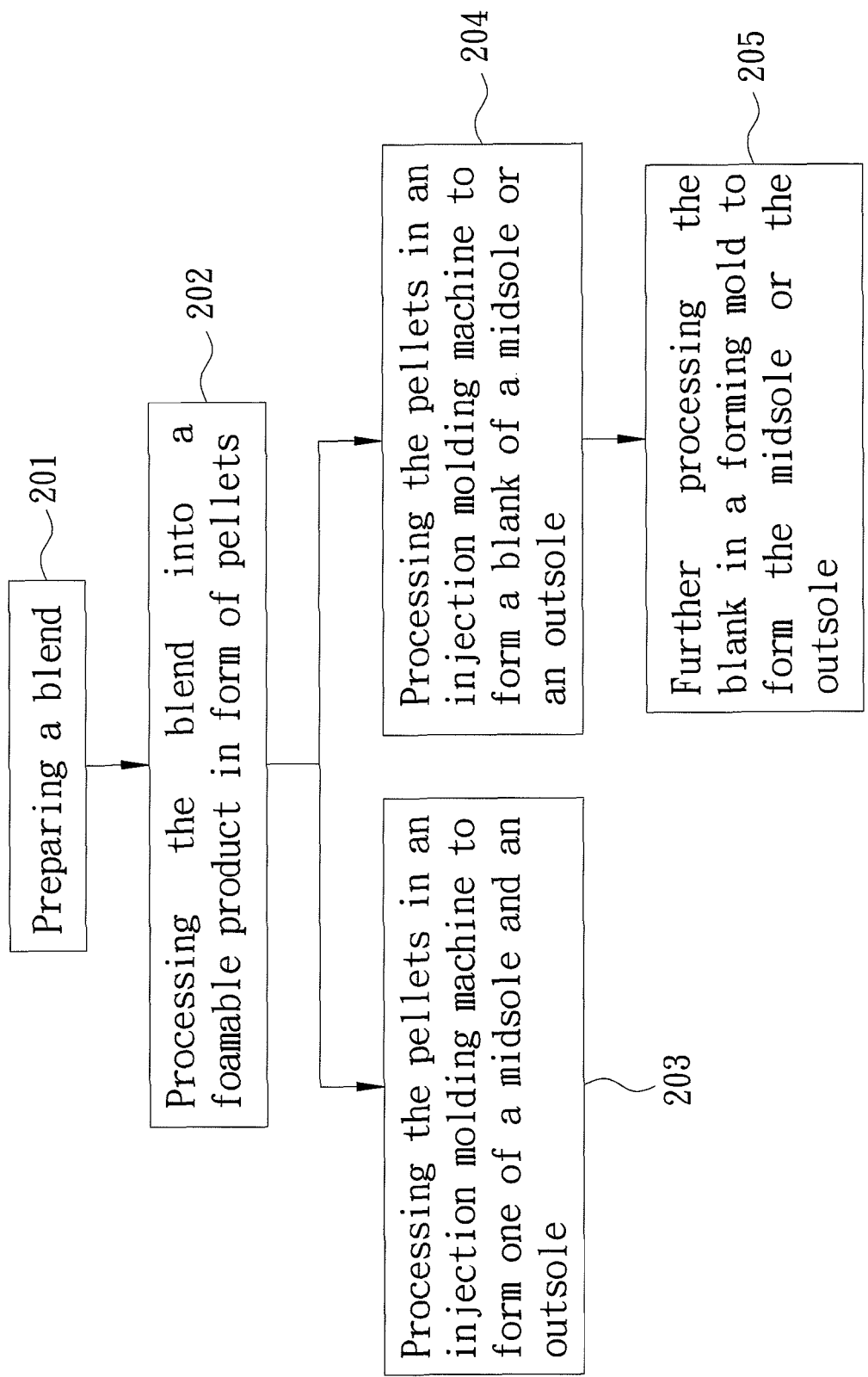
FIG. 2 is a flow chart showing the second preferred embodiment of the method for producing a bio-based polymeric shoe component according to the present invention.

FIG. 2 illustrates the second preferred embodiment of the method for producing a bio-based polymeric shoe component according to the present invention.

Step 201 is the same as step 101, and the description thereof is omitted.

In step 202, the blend is processed by a pelletizing machine to form a foamable product in a form of pellets. The procedures for pelletizing are well-known to the skilled artisan in the field related to this invention, and are therefore not described herein.

The pellets produced in the step 202 are processed further through the following step 203 or steps 204 and 205.

In step 203, the pellets are processed by an injection molding machine to form a midsole or an outsole. The injection molding machine is operated under a temperature of 165° C.~180° C. and a pressure of 160 kg/cm²~200 kg/cm².

In step 204, a blank of a midsole or an outsole is first formed by processing the pellets using an injection molding machine.

In step 205, the blank is further processed in a forming mold under a temperature of 150° C.~170° C. and a pressure of 100 kg/cm²~160 kg/cm² to form the midsole or the outsole.

It should be noted that, for reducing the specific gravity of the final product of the shoe component, the blend prepared in step 101 or 201 may include 1~50 weight parts of a polyolefin. When the amount of polyolefin increases, the shoe component will be lighter, but the structural strength of the shoe component will be weakened. Therefore, the amount of polyolefin should be well controlled.

For further illustration of this invention, examples are presented below. It should be noted herein that the examples are only for illustrative purpose and should not be deemed to limit implementation of this invention.

EXAMPLES

Shoe components (i.e., sole pads, midsoles or outsoles) made by the methods according to the present invention are exemplified by the following six examples. Physical property tests were conducted on the examples in order to determine whether the shoe components made by the methods according to the present invention comply with the standards for shoe components.

Example 1

The composition of Example 1 included 1000 grams of the modified starch, 4000 grams of EVA copolymer (3000 grams of EVA copolymer granules and 1000 grams of recycled EVA copolymer granules), 500 grams of polyolefin, 300 grams of talcum powder (filler), 133 grams of a foaming agent, 25 grams of DCP (crosslinking agent), 60 grams of stearic acid (lubricant) and 40 grams of a zinc oxide powder (foaming aid). The composition was pre-mixed and then further mixed in a kneader mixer for about 10 to 15 minutes. When the temperature in the mixer increased to about 110° C., the mixing operation already went on for 6 to 15 minutes, and a completely melt homogeneous blend resulted. The blend was then formed into a foamable product in the form of sheets through a twin-roller.

A stack of the sheets with a suitable weight (complying with a mold capacity) was placed into a preheated hydraulic compression mold that was preheated to about 165° C., and was heated for 20~30 minutes at a temperature of 165° C.±2° C. and a pressure ranging between 160 kg/cm² and 200 kg/cm² to undergo crosslinking and foaming. The heated time was determined based on the thickness of the mold. After the sheets were fully crosslinked and foamed to form a foam sheet, the foam sheet was removed from the mold and was cut into a sole pad.

Various physical properties of the sole pad of Example 1 were examined through standard test methods. The results are shown in Table 1.

TABLE 1

| Test Item | Testing Standard | Test result |
| --- | --- | --- |
| Hardness (Asker C) | ASTM D2240 | 24 |
| Density (g/cm³) | ASTM D297 | 0.094 |
| Tensile strength (kg/cm²) | ASTM 412 | 11.0 |
| Elongation (%) | ASTM D412 | 168 |
| Tear strength (kg/cm) | ASTM D624 | 6.0 |
| Split tear strength (kg/cm) | ASTM D3574 | 0.77 |
| Rebound (%) | ASTM D2632 | 45 |
| Shrinkage ratio (%) | 70° C. for 40 minutes | 2.36 |
| Compression set | ASTM D395 50° C. for 6 hours | 80.2 |

Example 2

The composition of Example 2 included 1250 grams of the modified starch, 4700 grams of EVA copolymer (3600 grams of EVA copolymer granules and 1100 grams of recycled EVA copolymer granules), 550 grams of polyolefin, 380 grams of talcum powder (filler), 160 grams of a foaming agent, 36 grams of DCP (crosslinking agent), 72 grams of stearic acid (lubricant) and 48 grams of a zinc oxide powder (foaming aid).

In Example 2, a sole pad was made by the same procedure as that in Example 1. Various physical properties of the sole pad of Example 2 were examined through standard test methods. The results are shown in Table 2.

TABLE 2

| Test Item | Testing Standard | Test result |
| --- | --- | --- |
| Hardness (Asker C) | ASTM D2240 | 26 |
| Density (g/cm³) | ASTM D297 | 0.095 |

TABLE 2-continued

| Test Item | Testing Standard | Test result |
|---|---|---|
| Tensile strength (kg/cm$^2$) | ASTM 412 | 11.2 |
| Elongation (%) | ASTM D412 | 172 |
| Tear strength (kg/cm) | ASTM D624 | 6.2 |
| Split tear strength (kg/cm) | ASTM D3574 | 0.79 |
| Rebound (%) | ASTM D2632 | 44 |
| Shrinkage ratio (%) | 70° C. for 40 minutes | 2.18 |
| Compression set | ASTM D395 50° C. for 6 hours | 81.0 |

Example 3

The composition of Example 3 included 1500 grams of the modified starch, 5700 grams of EVA copolymer (4500 grams of EVA copolymer granules and 1200 grams of recycled EVA copolymer granules), 630 grams of polyolefin, 490 grams of talcum powder (filler), 190 grams of a foaming agent, 45 grams of DCP (crosslinking agent), 83 grams of stearic acid (lubricant) and 56 grams of a zinc oxide powder (foaming aid).

In Example 3, a sole pad was made by the same procedure as that of Example 1. Various physical properties of the sole pad of Example 3 were examined through standard test methods. The results are shown in Table 3.

TABLE 3

| Test Item | Testing Standard | Test result |
|---|---|---|
| Hardness (Asker C) | ASTM D2240 | 28 |
| Density (g/cm$^3$) | ASTM D297 | 0.096 |
| Tensile strength (kg/cm$^2$) | ASTM 412 | 11.4 |
| Elongation (%) | ASTM D412 | 171 |
| Tear strength (kg/cm) | ASTM D624 | 6.4 |
| Split tear strength (kg/cm) | ASTM D3574 | 0.81 |
| Rebound (%) | ASTM D2632 | 42 |
| Shrinkage ratio (%) | 70° C. for 40 minutes | 2.06 |
| Compression set | ASTM D395 50° C. for 6 hours | 81.3 |

Example 4

The composition of Example 4 including 1000 grams of the modified starch, 1200 grams of EVA copolymer granules, 600 grams of polyolefin, 300 grams of talcum powder (filler), 80 grams of a foaming agent, 20 grams of DCP (crosslinking agent), 17 grams of stearic acid (lubricant) and 50 grams of a zinc oxide powder (foaming aid) was pre-mixed and then was further mixed in a kneader mixer for about 10 to 15 minutes. When the temperature in the mixer increased to about 120° C., the mixing operation already went on for 6 to 15 minutes, and a completely melt homogeneous blend resulted. The blend was then formed into a foamable product in the form of sheets through a twin-roller.

A stack of the sheets with a suitable weight (to match a mold's capacity) was placed into a preheated hydraulic compression mold that was preheated to about 165° C., and was heated for 20~30 minutes at a temperature of 165° C.±2° C. and a pressure ranging between 160 kg/cm$^2$ and 200 kg/cm$^2$ to undergo crosslinking and foaming. The heated time was determined based on the thickness of the mold. After the sheets were fully crosslinked and foamed to form a foam sheet, the foam sheet was further processed in a forming mold to form a midsole.

Various physical properties of the midsole of Example 4 were examined through standard test methods. The results are shown in Table 4.

TABLE 4

| Test Item | Testing Standard | Test result |
|---|---|---|
| Hardness (Asker C) | ASTM D2240 | 55 |
| Density (g/cm$^3$) | ASTM D297 | 0.190 |
| Tensile strength (kg/cm$^2$) | ASTM 412 | 22 |
| Elongation (%) | ASTM D412 | 226 |
| Tear strength (kg/cm) | ASTM D624 | 12.0 |
| Split tear strength (kg/cm) | ASTM D3574 | 2.16 |
| Rebound (%) | ASTM D2632 | 44 |
| Shrinkage ratio (%) | 70° C. for 40 minutes | 0.096 |
| Compression set | ASTM D395 50° C. for 6 hours | 35.5 |

Example 5

The composition of Example 5 included 1250 grams of the modified starch, 1400 grams of EVA copolymer granules, 700 grams of polyolefin, 380 grams of talcum powder (filler), 96 grams of a foaming agent, 25 grams of DCP (crosslinking agent), 23 grams of stearic acid (lubricant) and 60 grams of a zinc oxide powder (foaming aid).

In Example 5, a midsole was made by the same procedure as that of Example 4. Various physical properties of the midsole of Example 5 were examined through standard test methods. The results are shown in Table 5.

TABLE 5

| Test Item | Testing Standard | Test result |
|---|---|---|
| Hardness (Asker C) | ASTM D2240 | 57 |
| Density (g/cm$^3$) | ASTM D297 | 0.192 |
| Tensile strength (kg/cm$^2$) | ASTM 412 | 22.6 |
| Elongation (%) | ASTM D412 | 220 |
| Tear strength (kg/cm) | ASTM D624 | 11.8 |
| Split tear strength (kg/cm) | ASTM D3574 | 2.08 |
| Rebound (%) | ASTM D2632 | 43 |
| Shrinkage ratio (%) | 70° C. for 40 minutes | 0.095 |
| Compression set | ASTM D395 50° C. for 6 hours | 37.2 |

Example 6

The composition of Example 6 included 1500 grams of the modified starch, 1600 grams of EVA copolymer granules, 700 grams of polyolefin, 490 grams of talcum powder (filler), 102 grams of a foaming agent, 32 grams of DCP (crosslinking agent), 30 grams of stearic acid (lubricant) and 70 grams of a zinc oxide powder (foaming aid).

In Example 6, an outsole was made by the same procedure as that of Example 4. Various physical properties of the outsole of Example 6 were examined through standard test methods. The results are shown in Table 6.

TABLE 6

| Test Item | Testing Standard | Test result |
|---|---|---|
| Hardness (Asker C) | ASTM D2240 | 62 |
| Density (g/cm$^3$) | ASTM D297 | 0.22 |

TABLE 6-continued

| Test Item | Testing Standard | Test result |
| --- | --- | --- |
| Tensile strength (kg/cm$^2$) | ASTM 412 | 24.2 |
| Elongation (%) | ASTM D412 | 220 |
| Tear strength (kg/cm) | ASTM D624 | 12.0 |
| Split tear strength (kg/cm) | ASTM D3574 | 2.5 |
| Rebound (%) | ASTM D2632 | 40 |
| Shrinkage ratio (%) | 70° C. for 40 minutes | 0.07 |
| Compression set | ASTM D395 50° C. for 6 hours | 42.0 |

The results in Tables 1~6 show that the sole pads in Examples 1~3, the midsoles in Examples 4 and 5, and the outsole in Example 6 meet the respective standard requirements of shoe pads, midsoles and outsoles.

The results also show that the hardness and the structural strength of the sole pads are less than those of the midsoles and outsoles. As the sole pads do not require high structural strength, recycled EVA granules can be used to manufacture the sole pads for reducing the manufacturing cost.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for producing a bio-based polymeric shoe component, comprising:
preparing a blend from a composition comprising 5~50 weight parts of a modified starch, 50~95 weight parts of an ethylene vinyl acetate copolymer, 5~30 weight parts of a filler, 1~50 weight parts of a polyolefin, 2.0~8.0 weight parts of a foaming agent, 0.5~3.0 weight parts of a foaming aid, 0.5~2.0 weight parts of a lubricant, and 0.4~1.2 weight parts of a crosslinking agent, the modified starch being obtained by hydrolyzing and esterifying a predetermined amount of a raw starch to form a hydrolyzed and esterified starch, followed by drying the hydrolyzed and esterified starch;
processing the blend into a foamable product; and forming the foamable product into the shoe component.

2. The method of claim 1, wherein the blend is processed by a pelletizing machine so that the foamable product is in a form of pellets, and the pellets are processed by an injection molding machine.

3. The method of claim 2, wherein the injection molding machine is operated under a temperature of 165° C.~180° C. and a pressure of 160 kg/cm$^2$~200 kg/cm$^2$.

4. The method of claim 2, wherein the pellets are processed by the injection molding machine to form one of a midsole or an outsole.

5. The method of claim 4, wherein the pellets are first formed by the injection molding machine at a temperature of 165° C.~180° C. and a pressure of 160 kg/cm$^2$~200 kg/cm$^2$ to form a blank of a midsole or an outsole, and the blank is further processed in a forming mold under a temperature of 150° C.~170° C. and a pressure of 100 kg/cm$^2$~160 kg/cm$^2$ to form one of a midsole or outsole.

6. The method of claim 1, wherein the raw starch is hydrolyzed using by an inorganic solution that has a concentration of 0.5N~2N to form a hydrolyzed starch, the hydrolyzed starch being esterified by one of an organic acid or an acid anhydride to form a hydrolyzed and esterified starch, the hydrolyzed and esterified starch being dried to obtain the modified starch.

7. The method of claim 6, wherein the hydrolyzed and esterified starch is dried by spray drying to form the modified starch.

8. The method of claim 7, wherein the modified starch has a size ranging from 10 μm to 50 μm and a moisture content ranging from 2% to 8%.

9. The method of claim 6, wherein the raw starch has a number average molecular weight not less than $10^8$, the hydrolyzed starch having a number average molecular weight ranging from $10^4$ to $10^7$.

10. The method of claim 6, wherein the hydrolyzed starch is esterified by an acetic anhydride, followed by drying to form the modified starch.

11. The method of claim 1, wherein the blend is processed by a twin-roller so that the foamable product is a sheet, and the shoe component is one of a sole pad, a midsole, or an outsole, and is formed by stacking a plurality of the sheets having a predetermined weight, placing the sheets in a pre-heated hydraulic compression mold to form a foam sheet, followed by processing the foam sheet to form the shoe component.

12. The method of claim 11, wherein the hydraulic compression mold is operated under a temperature of 165° C.~175° C. and a pressure of 160 kg/cm$^2$~200 kg/cm$^2$.

13. The method of claim 12, wherein the sheets are placed in the hydraulic compression mold for 20~50 minutes; and wherein the foam sheet is cut into one of a sole pad, a midsole or an outsole.

14. The method of claim 12, wherein the sheets are placed in the hydraulic compression mold for 20~50 minutes; and wherein the foam sheet is formed into one of sole pad, a midsole or an outsole.

15. The method of claim 1, wherein the foamable product has the shape of a sheet or a pellet, and the shoe component includes one of a shoe pad, a midsole or an outsole.

16. The method of claim 1, wherein the blend is prepared by mixing and heating the composition for 6~15 minutes at a temperature of 100° C.~130° C.

17. The method of claim 1, wherein the filler is selected from a group consisting of calcium carbonate, talcum powder, magnesium carbonate, kaolin, and combinations thereof.

18. The method of claim 1, wherein a total weight of the modified starch and the ethylene vinyl acetate copolymer in the blend is 100 parts by weight.

19. The method of claim 1, wherein the crosslinking agent is a dicumyl peroxide, the lubricant is stearic acid, and the foaming aid is zinc oxide.

* * * * *